AIRCRAFT CONTROL APPARATUS AND DIFFERENCE AMPLIFIER THEREFOR
Filed May 28, 1963
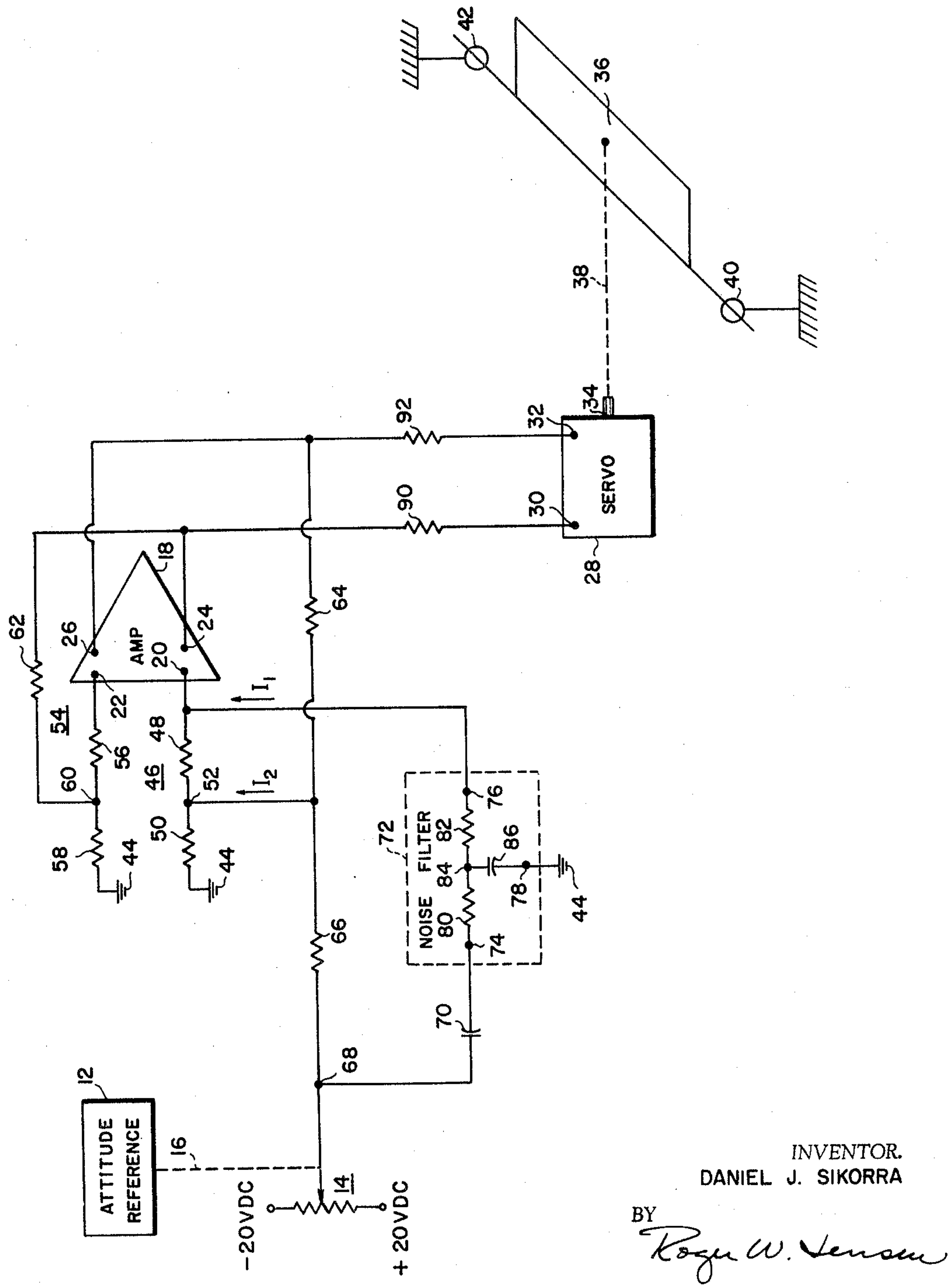
INVENTOR.
DANIEL J. SIKORRA
BY
Roger W. Jensen United States Patent Office 3,239,733
Patented Mar. 8, 1966

3,239,733

AIRCRAFT CONTROL APPARATUS AND DIFFERENCE AMPLIFIER THEREFOR

Daniel J. Sikorra, Champlin, Minn., assignor to Honeywell Inc., a corporation of Delaware Filed May 28, 1963, Ser. No. 283,882
10 Claims. (Cl. 318—18)

This invention relates to automatic control apparatus and in particular to control apparatus wherein two or more control signals must be blended or added in particular ratios to obtain an optimal control function.

In many automatic control systems, such as an autopilot for an aircraft, different signals must be blended together in proper ratios to obtain optimum control. Rate signals must often be added to displacement signals to provide anticipation and prevent overcontrol or overshoot. In the past it has often been necessary to amplify various signals separately before they are added together. In the present invention signals are amplified in the same amplifier and the input signals to the amplifier are weighted.

It is an object of this invention to provide a dual current gain input circuit for a difference amplifier.

It is another object of this invention to minimize the multiple use of single signal amplifiers in control systems, thereby decreasing the weight, size, and cost of the control systems.

It is another object of this invention to provide a control system utilizing a dual gain amplifier.

Various other objects, advantages, and features of the invention will become apparent to those skilled in the art from the accompanying disclosure and drawings in which the single figure is a diagram of a portion of the pitch channel in a control system for an aircraft.

*Description*

Attitude or condition reference means 12, such as a vertical gyro well known to those skilled in the art, actuates the adjustable arm of a potentiometer 14 through a connecting means 16. A suitable potential such as a total of 40 volts, from +20 volts to −20 volts D.C., is impressed across potentiometer 14. Amplifier 18 is a difference amplifier having input terminals 20, 22 and first and second output terminals 24, 26. Servo means 28 has first and second input terminals 30, 32 and an output shaft 34. Shaft 34 is coupled to an elevator 36 by coupling means 38. Elevator 36 is rotatably connected to an aircraft by connecting means 40, 42. Connected between the first input terminal 20 of amplifier 18 and a signal ground 44 is an impedance network 46 comprising impedance devices 48, 50 connected in series, with a common terminal 52. Connected between the second input terminal 22 of amplifier 18 and signal ground 44 is a second impedance network 54 comprising impedance devices 56, 58 connected in series with a common terminal 60. Symmetrical current feedback resistances 62, 64, although they need not necessarily be symmetrical, are connected between terminals 24, 60 and terminals 26, 52, respectively. Connected between the adjustable arm of potentiometer 14 and common terminal 52 of network 46 is a series resistor 66 with a common terminal 68 between the arm of potentiometer 14 and resistor 66. Connected to terminal 68 is one side of capacitor 70. Noise filter 72 has an input terminal 74, an output terminal 76, and a third terminal 78 which is returned to signal ground 44. The other side of capacitor 70 is connected to terminal 74. Noise filter 72 consists of series resistors 80, 82 connected between terminals 74, 76 with the terminal 84 common to both resistors 80, 82. Capacitor 86 is connected between common terminal 84 and terminal 78 of the noise filter 72. Terminal 76 of filter 72 is connected to the first input terminal 20 of amplifier 18. First and second output terminals 24, 26 of amplifier 18 are connected to first and second servo input terminals 30, 32 through resistance means 90, 92 respectively.

Difference amplifier 18 may be similar to an amplifier shown and described in a copending application of the present inventor, Serial No. 75,762, filed December 14, 1960, now Patent No. 3,168,709 entitled "Stabilized Transistor Difference Amplifier."

*Operation*

While the present invention has been found to be particularly useful in the automatic control system of an aircraft, it should be noted however that the particular use is not restricted and the pitch channel of an aircraft control system is merely used for purposes of illustration. It will be assumed that the aircraft is flying in a horizontal attitude when some disturbance causes the aircraft to pitch upward. This will cause the arm of potentiometer 14 to move with respect to the resistance element thereof, producing a signal voltage, that in this case will be assumed to be a positive D.C. voltage. The positive voltage developed at the adjustable arm of potentiometer 14 will cause a current to move towards junction 68 where it divides and takes two paths, one path toward resistor 66 and another path toward capacitor 70. The current going through resistor 66, being strictly resistive, is a function of attitude displacement, while the current in the path containing capacitor 70 is called a rate current since it is a function of the time rate of change of attitude displacement. Noise filter 72 is inserted in the rate path to prevent noise from interfering with the control signals. Two currents are thus applied to network 46, a first current $I_1$ (rate) applied to the first input terminal 20 of amplifier 18 and a second current $I_2$ (proportional) applied to common terminal 52 of network 46. $I_1$ flows through impedance devices 48, 50 to signal ground 44, producing a voltage drop and current $I_2$ only flows through impedance device 50 to signal ground 44. From this it is seen that if $I_1$ and $I_2$ are assumed equal, then $I_1$ will have a greater effect because it is passing through a greater resistance and therefore produces a larger voltage. By changing the ratio of impedance devices 48, 50, the effect of $I_1$ may be enhanced to a greater or lesser extent. It is assumed that currents $I_1$, $I_2$ produce a voltage drop in the input circuit of amplifier 18 that causes the voltage potential of the first output terminal 24 of amplifier 18 to be positive with respect to the second output terminal 26. Negative feedback is supplied from the output terminals of amplifier 18 to the impedance networks 46, 54 in the input circuit of the amplifier to stabilize the amplifier and to fix the gain. This is done by means of resistances 62, 64 connected between output terminals 24, 25 of amplifier 18 and impedance networks 54, 46. It is to be noted that a feedback path may be tied into the impedance network in a variety of ways, e.g., the feedback may enter or tie into an impedance network at a point which is not common to a signal input, and impedance networks 54, 46 may each have more than two resistors in series. The net potential difference across output terminals 24, 26 of amplifier 18 is transmitted to the input terminals 30, 32 of servo 28 through resistive means 90, 92. This potential difference applied to servo 28 causes shaft 34 to rotate in a direction such that when the position of elevator 36 is changed with respect to the aircraft the aircraft is returned to a horizontal pitch attitude. Assuming that the aircraft had pitched downward rather than upward, the direction of currents $I_1$, $I_2$ would be reversed, the polarity of the potential difference between the output terminals 24, 26 of amplifier 18 would be reversed, reversing the polarity of the input potential to the input terminals of servo 28, reversing the direction of rotation of shaft 34, and moving the elevator 36 in a proper direction to restore horizontal pitch attitude to the aircraft.

In an aircraft control system a greater change is desired when the aircraft pitch error is increasing. Thus, $I_1$ is greater when the aircraft is increasing in pitch (either upward or downward) and the control function provided by $I_1$ is correspondingly greater. When the aircraft is no longer increasing its pitch (error), $I_1$ decreases and the proportional signal $I_2$ has the greater affect until the aircraft is brought back to its correct pitch. The effect of $I_1$ (rate) is opposite to that of $I_2$ (proportional) when the aircraft is being returned to its correct attitude thereby providing a stabilizing action to prevent over-compensation and oscillation. Thus, this invention operates to weigh and add $I_1$ and $I_2$ and to blend them in proper proportion.

Currents $I_1$, $I_2$ can represent any signal current source and are not necessarily rate and proportional signals respectively. It is preferred, though not strictly necessary, that $I_1$ and $I_2$ are substantially ideal current sources, i.e., the currents are independent of the loads to which they are applied. Amplifier 18 need not have double ended input-output as shown but can take one of many forms, e.g., single ended input-output.

The invention has been described in connection with one embodiment and it is to be understood that this description is illustrative only and is not intended to limit the invention, the scope of which is defined by the following claims.

I claim:

1. In a control system for an aircraft, the combination comprising:
attitude reference means;
means for producing a first current signal indicative of the attitude of the aircraft with respect to said reference means;
means for producing a second current signal indicative of the time rate of change of the attitude of the aircraft with respect to said reference means;
a high gain, electronic, difference amplifier having first and second input and output terminals;
a first impedance network connected between the first input terminal of said amplifier and a signal ground, said network comprising two impedance devices connected in series with a common terminal between the devices;
a second impedance network connected between the second input terminal of said amplifier and signal ground;
means connected from the output terminals of said amplifier to said first and second networks, for supplying electrical negative feedback;
means for applying said first signal to the common terminal of said first network;
means for applying said second signal to the first input terminal of said amplifier;
servo means having first and second electrical input terminals and a mechanical output shaft;
means connecting the first and second output terminals of said amplifier to first and second input terminals respectively of said servo means, said amplifier providing a voltage signal to said servo means;
attitude changing means mechanically coupled to the aircraft; and
means mechanically coupling the shaft of said servo means to said attitude changing means.

2. In a control system for an aircraft, the combination comprising:
attitude reference means;
means for producing a first current signal indicative of the attitude of the aircraft with respect to said reference means;
means for producing a second current signal indicative of the time rate of change of the attitude of the aircraft with respect to said reference means;

a high gain electronic amplifier having an input terminal and an output terminal;
an impedance network connected between the input terminal of said amplifier and a signal ground, said network comprising two impedance devices connected in series with a common terminal between the devices;
means connected from the output terminal of said amplifier to the common terminal of said impedance network, for supplying electrical negative feedback;
means for applying the first signal to the common terminal of said impedance network;
means for applying the second signal to the input terminal of said amplifier;
servo means having an electrical input terminal and a mechanical output shaft;
means connecting the output terminal of said amplifier to the input terminal of said servo means, said amplifier providing a voltage signal to said servo means;
attitude changing means mechanically coupled to the aircraft; and
means mechanically coupling the shaft of said servo means to said attitude changing means.

3. In a condition controlling system for an object, the combination comprising:
condition reference means;
means for producing a first signal that is a function of a first condition of the object with respect to said condition reference means;
means for producing a second signal that is a function of a second condition of the object with respect to said condition reference means;
a high gain, electronic difference amplifier having first and second input and first and second output terminals;
a first impedance network connected between the first input terminal of said amplifier and a signal ground, said network comprising two impedance devices connected in series with a common terminal between the devices;
a second impedance network connected between the second input terminal of said amplifier and signal ground;
means connected from at least one output terminal of said amplifier to at least one of said first and second networks for supplying electrical negative feedback;
means for applying the first signal to the common terminal of said first network;
means for applying the second signal to the first input terminal of said amplifier; and
a controlled means having an input means connected to the output terminals of said amplifier, and adapted, when actuated, to perform a control function.

4. In a condition controlling system for an object, the combination comprising:
condition reference means;
means for producing a first signal that is a function of the first condition of the object with respect to said reference means;
means for producing a second signal that is a function of a second condition of the object with respect to said reference means;
a high gain amplifier having input and output terminals;
an impedance network connected between the input terminal of said amplifier and a signal ground, said network comprising two impedance devices connected in series with a common terminal between the devices;
means connected from the output terminal of said amplifier to the common terminal of said network for supplying negative feedback;
means for applying the signal that is a function of a first condition to the common terminal of said network;
means for applying the signal that is a function of a second condition to the input terminal of said amplifier; and a controlled means having an input means, the input means being connected to the output terminal of said amplifier, and said controlled means adapted, when actuated, to perform a control function.

5. A circuit for weighting, adding, and amplifying two electrical current signals, comprising:

an electronic difference amplifier, having first and second input terminals and first and second output terminals;

a first impedance network connected between the first input terminal of said amplifier and a signal ground, said network comprising a first and second impedance device connected in series with a common terminal between the first and second devices;

a second impedance network, substantially the same as said first network, connected between the second input terminal of said amplifier and the signal ground;

means connected from the output terminals of said amplifier to the common terminals of each impedance network, providing negative electrical feedback;

means for inserting a first current signal into the first input terminal of said amplifier; and means for inserting a second current signal into the common terminal of said first impedance network.

6. A circuit for weighting, adding, and amplifying two electrical current signals, comprising:

an electronic amplifier having an input terminal and an output terminal;

an impedance network connected between the input terminal of said amplifier and a signal ground, said network comprising a first and a second impedance devices connected in series with a common terminal between the first and second devices;

means connected from the output terminal of said amplifier to the common terminal of said impedance network, for providing negative electrical feedback;

means for inserting a first current signal into the input terminal of said amplifier; and means for inserting a second current signal into the common terminal of said impedance network.

7. In an electronic amplifier having an input terminal and an output terminal, an input impedance network for weighting and adding two current signals, the network comprising:

first and second electrical impedance devices connected in series between the input terminal of the amplifier and a signal ground and having a common terminal;

means connected between the output terminal of the amplifier and the common terminal of said first and second impedance devices to supply negative electrical feedback from the output terminal of the amplifier to the network;

means for applying a first current signal to the input terminal of the amplifier; and means for applying a second current signal to the common terminal between said first and second impedance devices in the network.

8. In an electronic difference amplifier having a first and second input terminal and a first and second output terminal, an input impedance means for weighting and adding two current signals, the input impedance means comprising:

first and second electrical impedance devices connected in series between the first input terminal of the amplifier and a signal ground and having a common terminal;

third and fourth electrical impedance devices connected in series between the second input terminal of the amplifier and signal ground and having a common terminal;

means connected between the output terminals of the amplifier and the common terminals between said first and second impedance devices and between said third and fourth impedance devices, to supply negative electrical feedback from the output terminals of the amplifier to the impedance devices;

means for applying a first current signal to the first input terminal of the amplifier; and means for applying a second current signal to the common terminal between said first and second impedance devices.

9. In a condition controlling system for an object, the combination comprising:

condition reference means;

means for producing a plurality of signals that are functions of a plurality of different conditions of the object with respect to said reference means;

a high gain amplifier having input and output terminals;

an empedance network connected between the input terminal of said amplifier and a signal ground;

means connected from the output terminal of said amplifier to said network for supplying negative feedback;

means for applying the plurality of signals that are functions of different conditions of the object to said network; and a controlled means having an input means, the input means being connected to the output terminal of said amplifier, and said controlled means adapted, when actuated, to perform a control function.

10. In a condition controlling system for an object, the combination comprising:

condition reference means;

means for producing a first signal that is a function of a first condition of the object with respect to said condition reference means;

means for producing a second signal that is a function of a second condition of the object with respect to said condition reference means;

a high gain, electronic difference amplifier having first and second input and output terminals;

a first impedance network connected between the first input terminal of said amplifier and a signal ground, said network comprising at least two impedance devices connected in series;

a second impedance network connected between the second input terminal of said amplifier and signal ground;

means connected from at least one of the output terminals of said amplifier to at least one of the networks for supplying electrical negative feedback;

means for applying the first signal to said first network;

means for applying the second signal to the first input terminal of said amplifier; and a controlled means having an input means connected to the output terminals of said amplifier, and adapted, when actuated, to perform a control function.

References Cited by the Examiner

UNITED STATES PATENTS 2,559,513 7/1951 Palmer ______________ 318—28

JOHN F. COUCH, *Primary Examiner.*